United States Patent
Li et al.

(10) Patent No.: US 10,909,989 B2
(45) Date of Patent: Feb. 2, 2021

(54) IDENTITY VECTOR GENERATION METHOD, COMPUTER DEVICE, AND COMPUTER-READABLE STORAGE MEDIUM

(71) Applicant: TENCENT TECHNOLOGY (SHENZHEN) COMPANY LIMITED, Guangdong (CN)

(72) Inventors: Wei Li, Shenzhen (CN); Binghua Qian, Shenzhen (CN); Xingming Jin, Shenzhen (CN); Ke Li, Shenzhen (CN); Fuzhang Wu, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 55 days.

(21) Appl. No.: 16/213,421

(22) Filed: Dec. 7, 2018

(65) Prior Publication Data
US 2019/0115031 A1    Apr. 18, 2019

Related U.S. Application Data

(63) Continuation of application No. PCT/CN2017/092892, filed on Jul. 14, 2017.

(30) Foreign Application Priority Data

Jul. 15, 2016 (CN) .......................... 2016 1 0560366

(51) Int. Cl.
*G10L 15/00* (2013.01)
*G10L 15/02* (2006.01)
(Continued)

(52) U.S. Cl.
CPC .............. *G10L 17/02* (2013.01); *G10L 17/14* (2013.01); *G10L 17/20* (2013.01)

(58) Field of Classification Search
CPC ........ G10L 17/00; G10L 17/005; G10L 15/07
See application file for complete search history.

(56) References Cited

U.S. PATENT DOCUMENTS

| | | | | |
|---|---|---|---|---|
| 8,060,366 B1 * | 11/2011 | Maganti | ................ | H04L 65/403 370/260 |
| 2008/0010065 A1 * | 1/2008 | Bratt | .................... | G06K 9/6222 704/246 |

(Continued)

FOREIGN PATENT DOCUMENTS

| CN | 102024455 A | 4/2011 |
|---|---|---|
| CN | 102820033 A | 12/2012 |

(Continued)

OTHER PUBLICATIONS

Li et al, "Sparsity analysis and compensation for i-vector based speaker verification" Sep. 2015, InInternational Conference on Speech and Computer Sep. 20, 2015 (pp. 381-388). Springer, Cham.*

(Continued)

*Primary Examiner* — Olujimi A Adesanya
(74) *Attorney, Agent, or Firm* — Sughrue Mion, PLLC

(57) ABSTRACT

An identity vector generation method is provided. The method includes obtaining to-be-processed speech data. Corresponding acoustic features are extracted from the to-be-processed speech data. A posterior probability that each of the acoustic features belongs to each Gaussian distribution component in a speaker background model is calculated to obtain a statistic. The statistic is mapped to a statistic space to obtain a reference statistic, the statistic space built according to a statistic corresponding to a speech sample exceeding a threshold speech duration. A corrected (Continued)

statistic is determined according to the calculated statistic and the reference statistic; and an identity vector is generated according to the corrected statistic.

20 Claims, 8 Drawing Sheets

(51) Int. Cl.
*G10L 17/02* (2013.01)
*G10L 17/14* (2013.01)
*G10L 17/20* (2013.01)

(56) References Cited

U.S. PATENT DOCUMENTS

| | | | | |
|---|---|---|---|---|
| 2013/0225128 | A1* | 8/2013 | Gomar | G10L 17/22 455/411 |
| 2014/0222428 | A1* | 8/2014 | Cumani | G10L 17/02 704/250 |
| 2015/0112684 | A1* | 4/2015 | Scheffer | G10L 17/14 704/257 |
| 2015/0154002 | A1* | 6/2015 | Weinstein | G06F 40/109 715/728 |
| 2015/0317990 | A1* | 11/2015 | Fousek | G10L 19/26 704/500 |
| 2016/0225374 | A1* | 8/2016 | Rodriguez | G10L 17/10 |
| 2017/0372706 | A1* | 12/2017 | Shepstone | G10L 17/02 |
| 2018/0082691 | A1* | 3/2018 | Khoury | G10L 17/02 |
| 2019/0005962 | A1* | 1/2019 | Mart Nez Gonz Lez | G10L 17/02 |
| 2019/0096424 | A1* | 3/2019 | Khoury | G10L 25/27 |
| 2020/0043504 | A1* | 2/2020 | Li | G10L 17/02 |

FOREIGN PATENT DOCUMENTS

| | | |
|---|---|---|
| CN | 105261367 A | 1/2016 |
| CN | 106169295 A | 11/2016 |

OTHER PUBLICATIONS

Li et al "An improved i-vector extraction algorithm for speaker verification", Jun. 27, 2015, EURASIP Journal on Audio, Speech, and Music Processing 2015, pp. 1-9.*

Li et al, "Feature sparsity analysis for i-vector based speaker verification", Jun. 2016, In Speech Communication. Jun. 1, 2016; vol. 80:60-70.*

Notification of First Office Action of Chinese Application 201605603663 dated Nov. 13, 2018.

International Search Report for PCT/CN2017/092892 dated Sep. 27, 2017 [PCT/ISA/210].

* cited by examiner

IDENTITY VECTOR GENERATION METHOD, COMPUTER DEVICE, AND COMPUTER-READABLE STORAGE MEDIUM

CROSS-REFERENCE TO RELATED PATENT APPLICATION

This application is a continuation of International Application No. PCT/CN2017/092892, filed on Jul. 14, 2017, which claims priority from Chinese Patent Application No. 201610560366.3, entitled "IDENTITY VECTOR GENERATION METHOD AND APPARATUS" filed with the with the Chinese Patent Office on Jul. 15, 2016, the disclosures of which are incorporated by reference in their entirety.

BACKGROUND

1. Field

This present disclosure relates generally to computer technologies, and more specifically relates to an identity vector generation method, a computer device, and a computer-readable storage medium.

2. Description of Related Art

Speaker identity authentication is an important identity authentication means, in which a speech made by a user is collected, a series of operations such as preprocessing, feature extraction, modeling, and parameter estimation are performed on the collected speech, and the speech on which the operations have been performed is mapped to a vector that may represent speech features of the speaker, where the vector is referred to as an identity vector (i-vector). The identity vector may favorably represent speaker identity information included in the corresponding speech.

Currently, to generate an identity vector of speech data, acoustic features of the speech data need to be extracted, and based on a speaker background model in a form of a Gaussian mixture model, a statistic of a posterior probability that each of the acoustic features belongs to each Gaussian distribution component in the speaker background model is calculated, to generate an identity vector based on the statistic.

However, in the existing identity vector generation manner, short speech duration of speech data or sparse speech causes degradation of identity authentication performance of an identity vector.

SUMMARY

According to embodiments of present disclosure, an identity vector generation method, a computer device, and a computer-readable storage medium are provided.

Details of one or more embodiments of this application are provided in the following accompanying drawings and descriptions. Other features and advantages of this application become more obvious with reference to the specification, the accompanying drawings, and the claims.

BRIEF DESCRIPTION OF THE DRAWINGS

The accompanying drawings, which are included to provide further understanding and are incorporated and constitute a part of this specification, illustrate disclosed embodiments and together with the description serve to explain the principles of the disclosed embodiments. In the drawings.

DETAILED DESCRIPTION

To make the technical solutions and advantages of the present disclosure clearer and more comprehensible, the following further describes this application in detail with reference to the accompanying drawings and embodiments. It should be understood that the specific embodiments described herein are merely used for explaining this application but are not intended to limit this application.

It may be understood that terms such as "first" and "second" used in this application may be used for describing various components in this specification. However, these components are not limited to these terms. These terms are used merely to differentiate one component from another. A first zero-order statistic and a second zero-order statistic are both zero-order statistics, but are not a same zero-order statistic.

In some implementations, systems and methods according to the present disclosure may provide identity vector generation.

Figure 1:
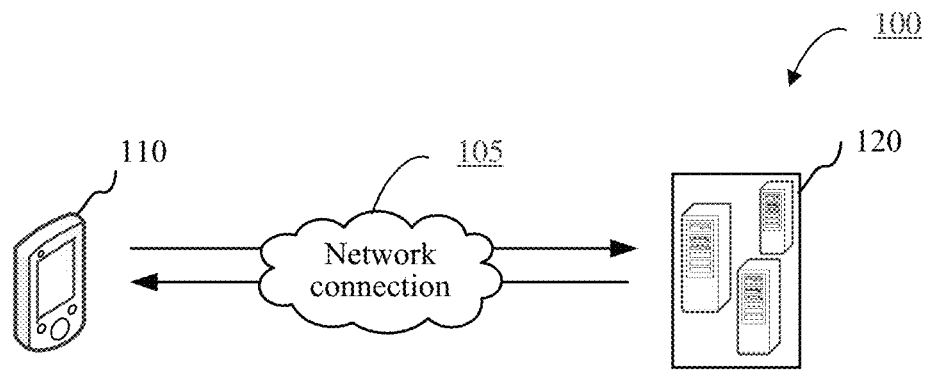
FIG. 1 is a diagram of an application environment of a speaker recognition system according to an example embodiment.

FIG. 1 is a diagram of an environment 100 of a speaker recognition system according to an example embodiment. As shown in FIG. 1, the system includes a terminal 110 and a server 120 that are connected by using a network 105. The terminal 110 collects to-be-verified speech data, generates a to-be-verified identity vector by using, for example, an identity vector generation method, discussed with reference to FIGS. 3-5, and sends the to-be-verified identity vector to the server 120. The server 120 collects speech data of a target speaker category, and generates a target speaker identity vector by using, for example, the identity vector generation methods discussed with reference to FIGS. 3-5. The server 120 calculates a similarity between the to-be-verified identity vector and the target speaker identity vector, and performs speaker identity authentication according to the calculated similarity. The server 120 feeds back an identity authentication result to the terminal 110.

Figure 2A:
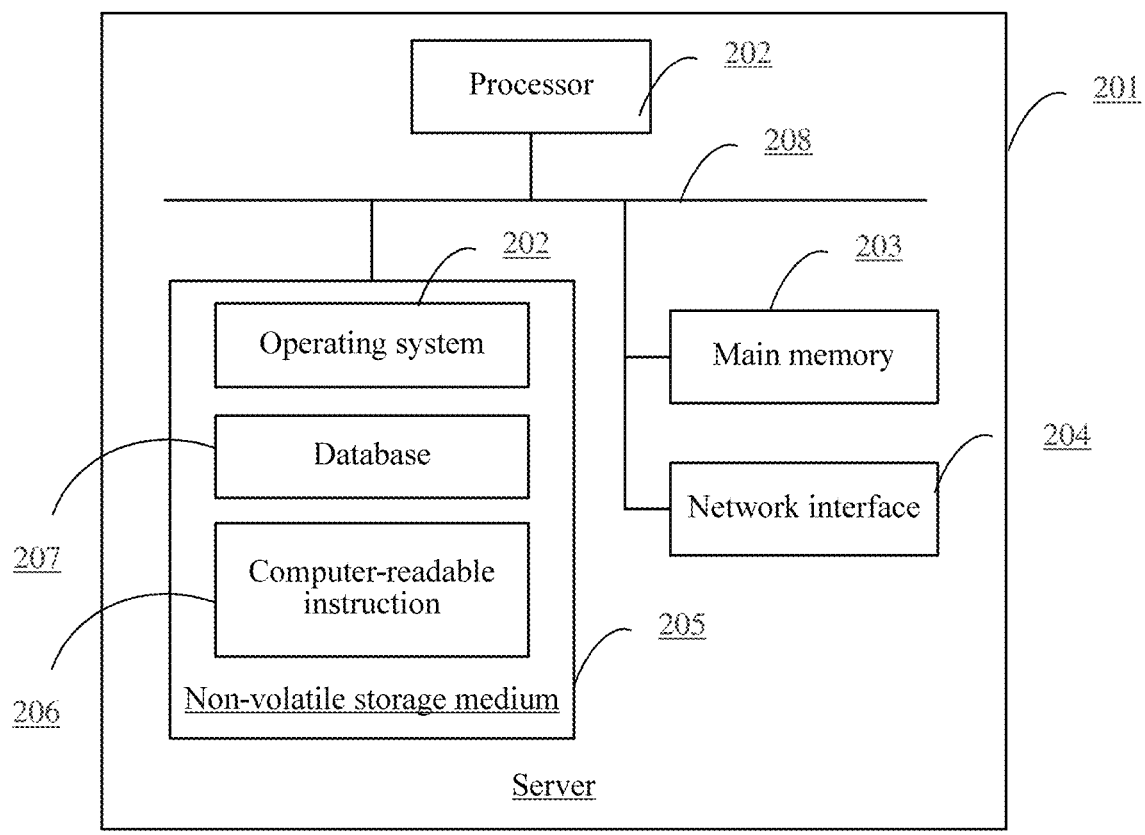
FIG. 2A is a schematic diagram of an internal structure of a server according to an example embodiment.

FIG. 2A is a schematic diagram of an internal structure of a server 201 according to an example embodiment. As shown in FIG. 2A, the server 201 includes a processor 202, a non-volatile storage medium 205, a main memory 203, and a network interface 204 that are connected by using a system bus 208. The non-volatile storage medium 205 of the server 201 stores an operating system 209, a database 207, and computer-readable instructions 206. When executed by the processor 202, the computer-readable instructions 206 cause the processor 202 to implement an identity vector generation method, discussed with reference to FIGS. 3-5. The processor 202 of the server 201 is configured to provide computing and control capabilities to support running of the entire server 201. In some implementations, the main memory 203 of the server 201 store computer-readable instructions. When executed by the processor 202, the computer-readable instructions may cause the processor 202 to perform an identity vector generation method, discussed with reference to FIGS. 3-5. The network interface 204 of the server 201 is configured to perform connection and communication with a terminal. The server 201 may be implemented as an independent server or implemented by using a server cluster including multiple servers. A person skilled in the art may understand that, in the structure shown in FIG. 2A, only a block diagram of a partial structure related to a solution in this application is shown, and does not constitute a limit to the server to which the solution in this application is applied. Specifically, the server 201 may include more components or fewer components than those shown in the figure, or some components may be combined, or a different component deployment may be used.

Figure 2B:
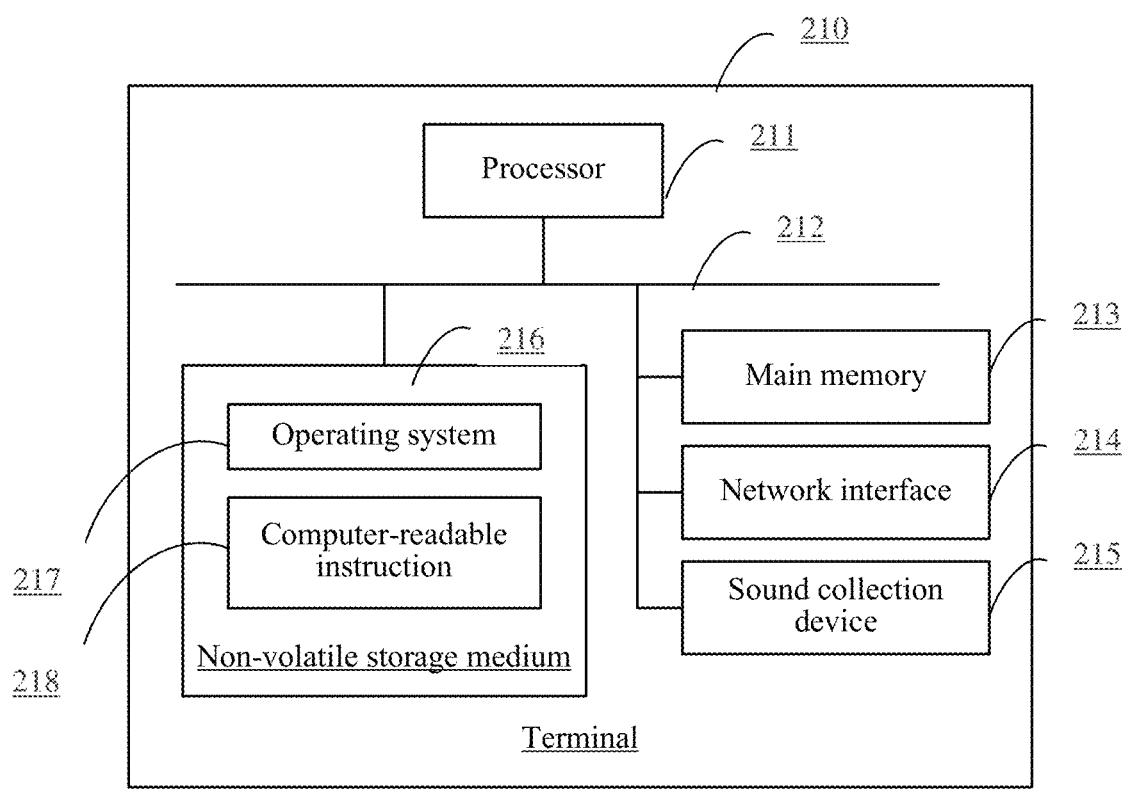
FIG. 2B is a schematic diagram of an internal structure of a terminal according to an example embodiment.

FIG. 2B is a schematic diagram of an internal structure of a terminal 210 according to an example embodiment. As shown in FIG. 2B, the terminal 210 includes a processor 211, a non-volatile storage medium 216, a main memory 213, a network interface 214, and a sound collection device 215 that are connected by using a system bus 212. The non-volatile storage medium 216 of the terminal 210 stores an operating system 217, and further stores computer-readable instructions 218. When executed by the processor 211, the computer-readable instructions 218 cause the processor 211 to implement an identity vector generation method, such as the example method discussed with reference to FIGS. 3-5. The processor 211 is configured to provide computing and control capabilities to support running of the entire terminal 210. In some implementations, the main memory 213 of the terminal 210 may store computer-readable instructions. When executed by the processor 211, the computer-readable instructions cause the processor 211 to perform an identity vector generation method, such as the example methods discussed with reference to FIGS. 3-5. The network interface 212 is configured to perform network communication with a server, such as the server 201 in FIG. 2A. In some implementations, the terminal 210 may be a mobile phone, a tablet computer, a personal digital assistant, a wearable device, or the like. A person skilled in the art may understand that, in the structure shown in FIG. 2B, only a block diagram of a partial structure related to a solution in this application is shown, and does not constitute a limit to the terminal to which the solution in this application is applied. Specifically, the terminal 210 may include more components or fewer components than those shown in the figure, or some components may be combined, or a different component deployment may be used.

Figure 3:
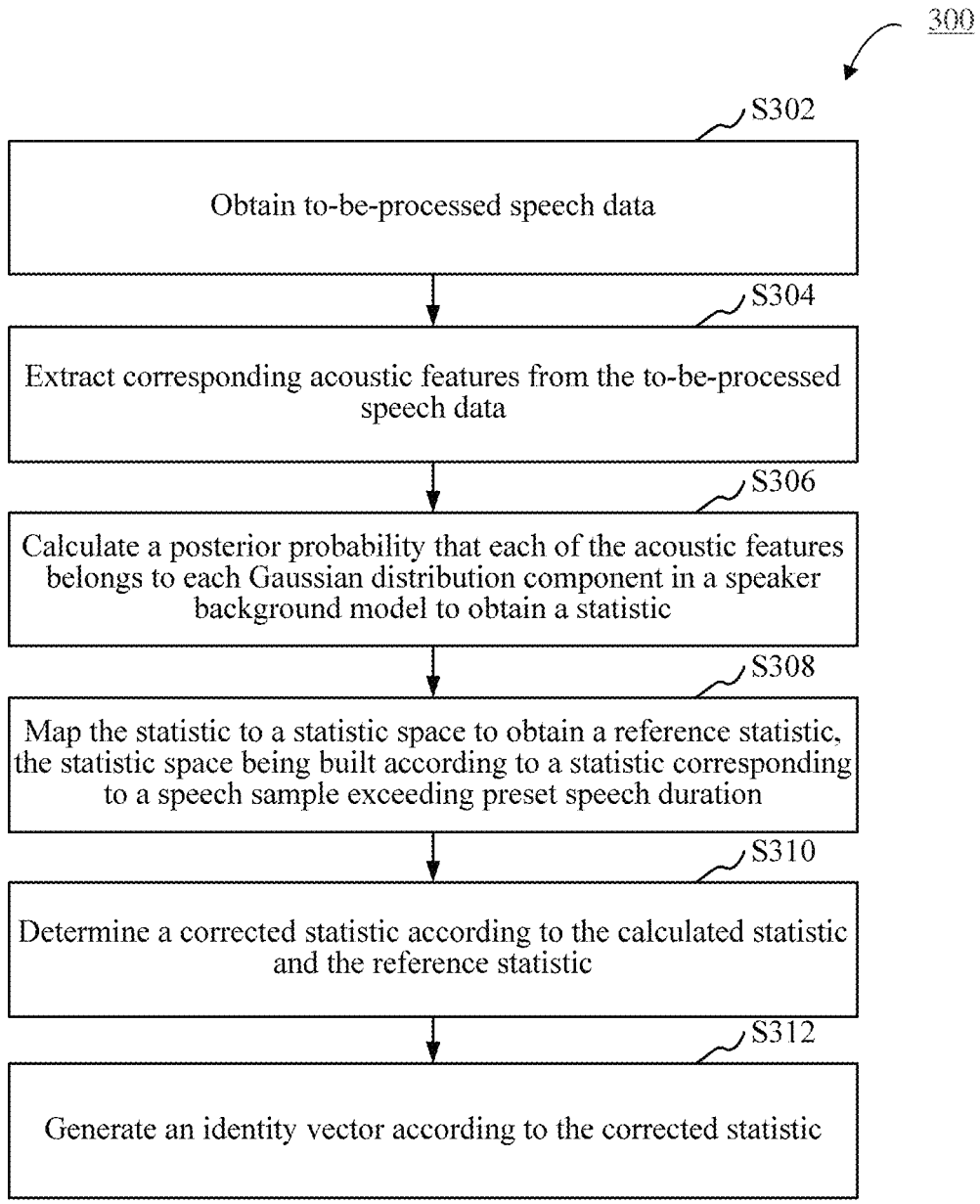
FIG. 3 is a flowchart of an identity vector generation method according to an example embodiment.

FIG. 3 is a flowchart of an identity vector generation method 300 according to an example embodiment. This example embodiment is described by using an example in which the method 300 is applied to a server, such as the server 120, shown in FIG. 1. Referring back to FIG. 3, the method 300 includes the following:

S302. Obtain to-be-processed speech data.

The to-be-processed speech data refers to speech data on which a series of processing needs to be performed to generate a corresponding identity vector. The speech data is data formed by storing sound that is generated after a speaker speaks is collected by a sound collection device. The to-be-processed speech data may include to-be-verified speech data and speech data of a target speaker category. The to-be-verified speech data refers to speech data whose speaker category is unknown, where whether the speech data belongs to the target speaker category needs to be determined. The target speaker category is a known speaker category, and is a category including speech data generated after a target speaker speaks.

S304. Extract corresponding acoustic features from the to-be-processed speech data.

The server may preprocess the to-be-processed speech data, for example, perform noise filtering or speech format unification on the to-be-processed speech data, and then extract a corresponding acoustic feature vector from the preprocessed to-be-processed speech data. The acoustic feature vector refers to a vector including acoustic features reflecting acoustic properties. The acoustic feature vector includes a series of acoustic features. The acoustic feature may be a mel-frequency cepstral coefficient (MFCC) or a linear predictive cepstral coefficient (LPCC).

S306. Calculate a posterior probability that each of the acoustic features belongs to each Gaussian distribution component in a speaker background model to obtain a statistic.

The speaker background model is a Gaussian mixture model obtained through training by using a series of speech samples, and is used for training a distribution of features representing irrelevance to a speaker. The Gaussian mixture model is a mathematical model obtained by combing a fixed quantity of Gaussian distribution components. The speaker background model may be obtained through training by using an expectation maximization algorithm (EM algorithm). The speaker background model may use a Gaussian mixture model-universal background model (GMM-UBM).

In an embodiment, the speaker background model may be expressed by using the following formula (1):

$$P(x) = \sum_{c=1}^{C} a_c N(x|\mu_c, \Sigma_c) \quad \text{formula (1)}$$

where x represents a speech sample; C is a total quantity of Gaussian distribution components included in a Gaussian mixture model, and c represents a sequence number of a Gaussian distribution component included in the Gaussian mixture model; $N(x|\mu_c, \Sigma_c)$ represents a $c^{th}$ Gaussian distribution component; $a_c$ is a coefficient of the $c^{th}$ Gaussian distribution component; $\mu_c$ is an average value of the $c^{th}$ Gaussian distribution component; and $\Sigma_c$ is a variance of the $c^{th}$ Gaussian distribution component.

In an embodiment, the acoustic feature vector may be expressed as $\{y_1, y_2 \ldots y_L\}$. The acoustic feature vector includes L acoustic features, and each acoustic feature may be represented as $y_t$, where $t \in [1, L]$. In an embodiment, a posterior probability that each of the acoustic features belongs to each Gaussian distribution component in the speaker background model may be expressed as: $P(c|y_t, \Omega)$, where $\Omega$ represents the speaker background model, and $P(c|y_t, \Omega)$ represents a posterior probability that an acoustic features $y_t$ belongs to the $c^{th}$ Gaussian distribution component when a speaker background model $\Omega$ and an acoustic features $y_t$ have been observed. The server may perform statistics collection based on the posterior probability $P(c|y_t, \Omega)$ to obtain a statistic.

S308. Map the statistic to a statistic space to obtain a reference statistic, the statistic space being built according to a statistic corresponding to a speech sample exceeding preset speech duration.

The statistic space is a vector space. The statistic space is built according to a statistic of a same type as the foregoing calculated statistic corresponding to the speech sample. Speech duration of the speech sample for building a statistic space exceeds the preset speech duration. The preset speech duration may be, for example, 30 seconds. The speech sample for building a statistic space may be a speech sample that exceeds the preset speech duration and that is selected from speech samples for training a speaker background model. The calculated statistic is mapped to the statistic space to obtain a reference statistic. The reference statistic is a prior statistic that is determined according to the statistic corresponding to the speech sample exceeding the preset speech duration.

S310. Determine a corrected statistic according to the calculated statistic and the reference statistic.

The corrected statistic is a statistic obtained after the calculated statistic is corrected by using the reference statistic. The statistic combines the prior statistic and a posterior statistic.

S312. Generate an identity vector according to the corrected statistic.

Specifically, after the corrected statistic is obtained, an identity vector may be generated in a regular identity vector generation manner by using the corrected statistic.

According to the foregoing identity vector generation method 300, a statistic space is built according to a statistic corresponding to a speech sample exceeding preset speech duration. After a posterior probability that each of acoustic features belongs to each Gaussian distribution component in a speaker background model is calculated to obtain a statistic, the statistic is mapped to the statistic space, and an obtained reference statistic is a prior statistic. The calculated statistic is corrected by using the prior statistic to obtain a corrected statistic. The corrected statistic may compensate for a statistic offset estimation caused by extremely short speech duration of to-be-processed speech data and sparse speech, and improve identity authentication performance of an identity vector.

Figure 4:
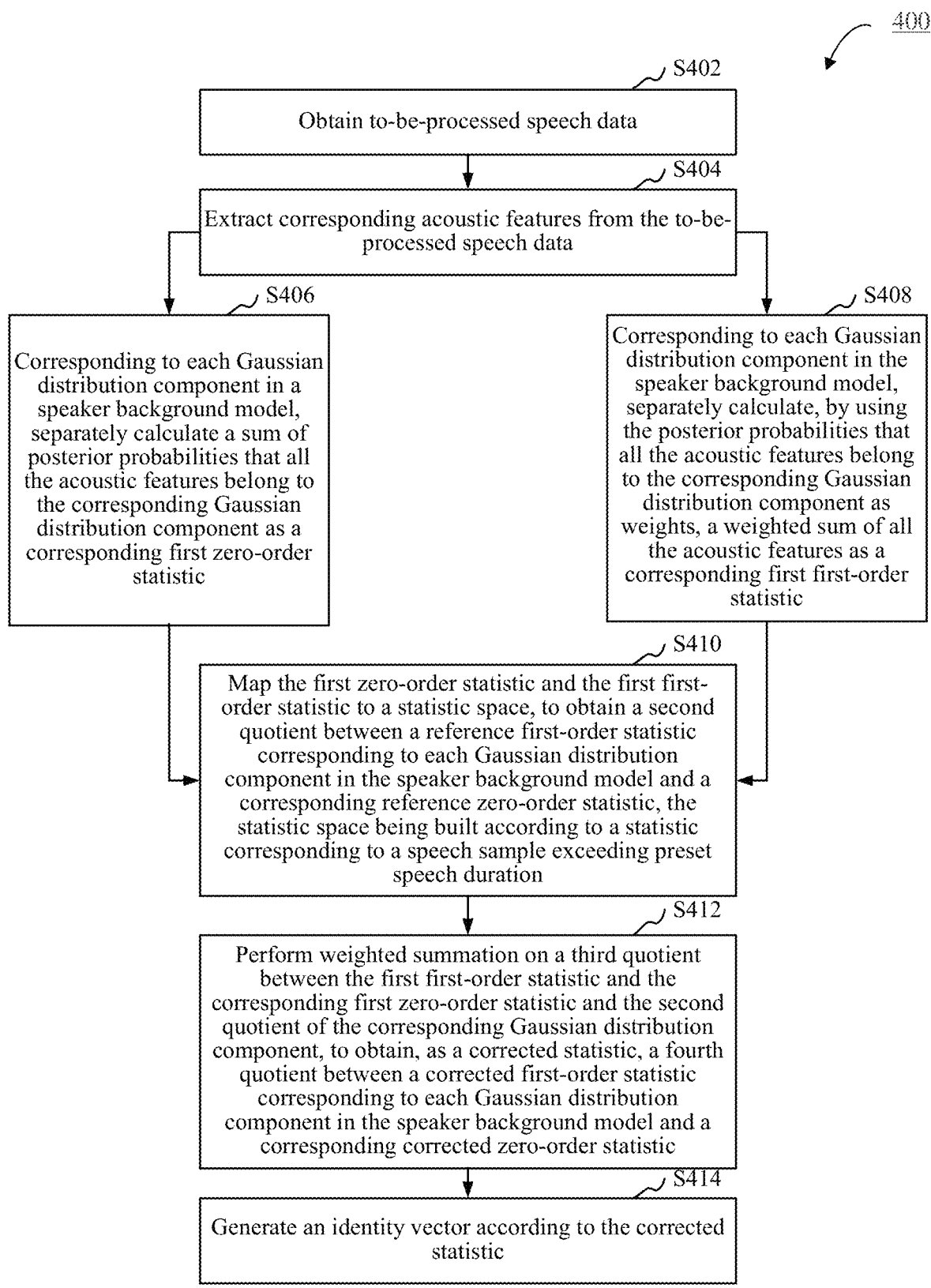
FIG. 4 is a flowchart of an identity vector generation method according to another example embodiment.

FIG. 4 is a flowchart of an identity vector generation method 400 according to another example embodiment. As shown in the FIG. 4, the identity vector generation method 400 includes the following:

S402. Obtain to-be-processed speech data.

S404. Extract corresponding acoustic features from the to-be-processed speech data.

S406. Corresponding to each Gaussian distribution component in a speaker background model, separately calculate a sum of posterior probabilities that all the acoustic features belong to the corresponding Gaussian distribution component as a corresponding first zero-order statistic.

Specifically, corresponding to each Gaussian distribution component c in a speaker background model $\Omega$, a sum of posterior probabilities $P(c|y_t, \Omega)$ that all the acoustic features $y_t$ belong to the corresponding Gaussian distribution component c is separately calculated, and the sum is used as a first zero-order statistic corresponding to the corresponding Gaussian distribution component c.

More specifically, a first zero-order statistic $N_c(u)$ corresponding to the corresponding Gaussian distribution component c may be calculated by using the following formula (2):

$$N_c(u)=\Sigma_{t=1}^{L}P(c|y_t,\Omega) \qquad \text{formula (2)}$$

where u represents the to-be-processed speech data; $N_c(u)$ represents a first zero-order statistic that is of the to-be-processed speech data u and that corresponds to the Gaussian distribution component c; $y_t$ represents a $t^{th}$ acoustic feature in the L acoustic features of the acoustic feature vector; and $P(c|y_t, \Omega)$ represents a posterior probability that the acoustic feature $y_t$ belongs to the $c^{th}$ Gaussian distribution component when the speaker background model $\Omega$ and the acoustic feature $y_t$ have been observed.

S408. Corresponding to each Gaussian distribution component in the speaker background model, separately calculate, by using the posterior probabilities that all the acoustic features belong to the corresponding Gaussian distribution component as weights, a weighted sum of all the acoustic features as a corresponding first first-order statistic.

S404 and S406 are included in the foregoing step S304. Specifically, corresponding to each Gaussian distribution component c in the speaker background model, a weighted sum of all the acoustic features $y_t$ is separately calculated by using the posterior probabilities $P(c|y_t, \Omega)$ that all the acoustic features $y_t$ belong to the corresponding Gaussian distribution component c as weights, and the weighted sum is used as a first zero-order statistic corresponding to the corresponding Gaussian distribution component c.

More specifically, a first first-order statistic $F_c(u)$ corresponding to the corresponding Gaussian distribution component c may be calculated by using the following formula (3):

$$F_c(u)=\Sigma_{t=1}^{L}P(c|y_t,\Omega)y_t \qquad \text{formula (3)}$$

where u represents the to-be-processed speech data; $F_c(u)$ represents a first first-order statistic that is of the to-be-processed speech data u and that corresponds to the Gaussian distribution component c; $y_t$ represents the $t^{th}$ acoustic feature in the L acoustic features of the acoustic feature vector; and $P(c|y_t, \Omega)$ represents the posterior probability that the acoustic feature $y_t$ belongs to the $c^{th}$ Gaussian distribution component when the speaker background model $\Omega$ and the acoustic feature $y_t$ have been observed.

S410. Map the first zero-order statistic and the first first-order statistic to a statistic space, to obtain a second quotient between a reference first-order statistic corresponding to each Gaussian distribution component in the speaker background model and a corresponding reference zero-order statistic, the statistic space being built according to a statistic corresponding to a speech sample exceeding preset speech duration.

Specifically, a first zero-order statistic $N_c(u)$ and a first first-order statistic $F_c(u)$ are mapped to a statistic space H, to obtain a second quotient: $F_c^{ref}(u)/N_c^{ref}(u)$ corresponding to a reference first-order statistic $F_c^{ref}(u)$ of each distribution component c in the speaker background model and a corresponding reference zero-order statistic $N_c^{ref}(u)$.

S412. Perform weighted summation on a third quotient between the first first-order statistic and the corresponding first zero-order statistic and the second quotient of the corresponding Gaussian distribution component, to obtain, as a corrected statistic, a fourth quotient between a corrected first-order statistic corresponding to each Gaussian distribution component in the speaker background model and a corresponding corrected zero-order statistic.

Specifically, the corrected statistic corresponding to the Gaussian distribution component c may be calculated by using the following formula (4):

$$\frac{\widetilde{F_c}(u)}{\widetilde{N_c}(u)} = R1 * \frac{F_c^{ref}(u)}{N_c^{ref}(u)} + R2 * \frac{F_c(u)}{N_c(u)} \qquad \text{formula (4)}$$

where $\tilde{F}_c(u)$ represents a corrected first-order statistic corresponding to the Gaussian distribution component c; $\tilde{N}_c(u)$ represents a corrected zero-order statistic corresponding to the Gaussian distribution component c; R1 and R2 are weights;

$$\frac{F_c^{ref}(u)}{N_c^{ref}(u)}$$

represents a second quotient corresponding to the Gaussian distribution component c;

$$\frac{F_c(u)}{N_c(u)}$$

represents a third quotient corresponding to the Gaussian distribution component c; and a sum of R1 and R2 may be limited to 1.

In an embodiment, in the weighted summation, a weight of the third quotient is a result obtained by dividing a first zero-order statistic of the corresponding Gaussian distribution component by a sum of the corresponding first zero-order statistic and an adjustable parameter, and a weight of the second quotient is a result obtained by dividing the adjustable parameter by a sum of the first zero-order statistic of the corresponding Gaussian distribution component and the adjustable parameter.

Specifically, the corrected statistic corresponding to the Gaussian distribution component c may be calculated by using the following formula (5):

$$\frac{\widetilde{F_c}(u)}{\widetilde{N_c}(u)} = \frac{q}{N_c(u)+q} * \frac{F_c^{ref}(u)}{N_c^{ref}(u)} + \frac{N_c(u)}{N_c(u)+q} * \frac{F_c(u)}{N_c(u)} \qquad \text{formula (5)}$$

where a weight of the third quotient $$\frac{F_c(u)}{N_c(u)} \text{ is } \frac{N_c(u)}{N_c(u)+q},$$

and is a result obtained by dividing a first zero-order statistic $N_c(u)$ of the corresponding Gaussian distribution component c by a sum of the corresponding first zero-order statistic $N_c(u)$ and an adjustable parameter q, and a weight of the second quotient $$\frac{F_c^{ref}(u)}{N_c^{ref}(u)} \text{ is } \frac{q}{N_c(u)+q},$$

and is a result obtained by dividing the adjustable parameter q by a sum of the first zero-order statistic $N_c(u)$ of the corresponding Gaussian distribution component c and the adjustable parameter q. When q falls within 0.4 to 1, a favorable effect may be achieved. In this embodiment, differentiated adjustments may be performed for different environments by adjusting the adjustable parameter, to increase robustness.

S414. Generate an identity vector according to the corrected statistic.

Specifically, when $\tilde{N}_c(u) = N_c(u)$, $\tilde{F}_c(u)$ may be calculated.

A supervector m of an average value of the speaker background model may be defined according to the following formula (6):

$$m = \begin{pmatrix} \mu_1 \\ \mu_2 \\ \vdots \\ \mu_C \end{pmatrix} \qquad \text{formula (6)}$$

where $\mu_1, \mu_2 \ldots \mu_C$ are separately average values of the Gaussian distribution components of the speaker background model.

A corrected zero-order statistic matrix $\tilde{N}(u)$ in a form of a diagonal matrix is defined according to the following formula (7):

$$\tilde{N}(u) = \begin{bmatrix} \tilde{N}_1(u) & & & \\ & \tilde{N}_2(u) & & \\ & & \ddots & \\ & & & \tilde{N}_C(u) \end{bmatrix} \qquad \text{formula (7)}$$

where $\tilde{N}_1(u), \tilde{N}_2(u) \ldots \tilde{N}_C(u)$ are separately corrected zero-order statistics corresponding to the Gaussian distribution components of the speaker background model.

A corrected first-order statistic matrix $\tilde{F}(u)$ is defined according to the following formula (8):

$$\tilde{F}(u) = \begin{pmatrix} \tilde{F}_1(u) \\ \tilde{F}_2(u) \\ \vdots \\ \tilde{F}_C(u) \end{pmatrix} \qquad \text{formula (8)}$$

where $\tilde{F}_1(u), \tilde{F}_2(u) \ldots \tilde{F}_C(u)$ are separately corrected first-order statistics corresponding to the Gaussian distribution components of the speaker background model.

In an embodiment, an identity vector $\tilde{\omega}(u)$ may be calculated according to the following formula (9):

$$\tilde{\omega}(u) = (I + T^t \Sigma^{-1} \tilde{N}(u) T)^{-1} T^t \Sigma^{-1} (\tilde{F}(u) - \tilde{N}(u)m) \qquad \text{formula (9)}$$

where I represents an identity matrix; T represents a known total factor matrix; t represents a transpose; $\Sigma$ represents a covariance matrix in a form of a diagonal matrix, a diagonal element of $\Sigma$ is a covariance of each Gaussian distribution component; m represents a supervector of an average value of the speaker background model; $\tilde{N}(u)$ represents a corrected zero-order statistic matrix; and $\tilde{F}(u)$ represents a corrected first-order statistic matrix.

In an embodiment, the foregoing formula (9) may be transformed, to change calculated related to the matrices $\tilde{F}(u)$ and $\tilde{N}(u)$ to calculation related to $$\frac{\tilde{F_c}(u)}{\tilde{N_c}(u)}$$

and $\tilde{N_c}(u)$, where $\tilde{N_c}(u)=N_c(u)$. In this embodiment, after being obtained, $$\frac{\tilde{F_c}(u)}{\tilde{N_c}(u)}$$

may be directly used to calculate an identity vector, without a need to build the matrices $\tilde{F}(u)$ and $\tilde{N}(u)$, thereby simplifying calculation.

In this embodiment, use of a first first-order statistic and a first zero-order statistic may more accurately reflect properties of acoustic features, thereby facilitating calculation of an accurate corrected statistic. Because a quotient between a first-order statistic and a corresponding zero-order statistic basically remains in a stable range, a linear summation may be directly performed when the corrected statistic is determined, thereby reducing a calculation amount.

Figure 5:
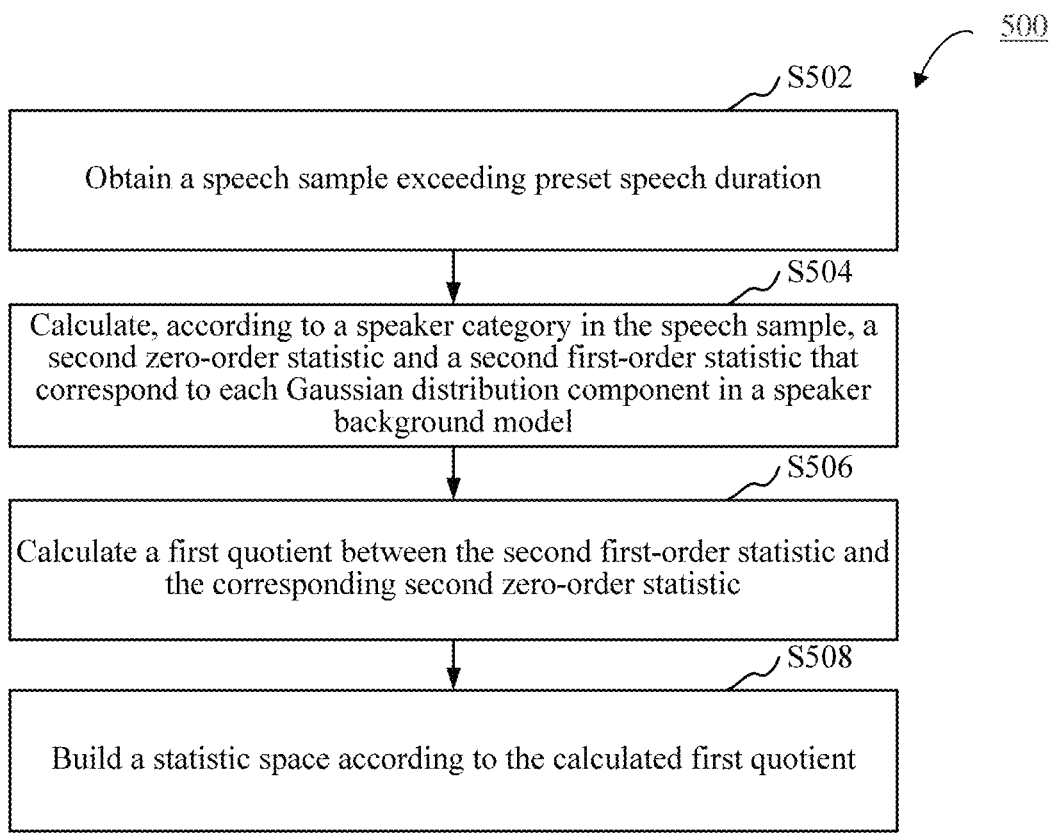
FIG. 5 is a flowchart of steps of building a statistic space according to an example embodiment.

FIG. 5 is a flowchart of a method 500 for building a statistic space according to an example embodiment. Referring to FIG. 5, the method 500 building a statistic space includes the following:

S502. Obtain a speech sample exceeding preset speech duration.

Specifically, a speech sample whose speech duration exceeds preset speech duration may be selected from speech samples for training a speaker background model.

S504. Calculate, according to a speaker category in the speech sample, a second zero-order statistic and a second first-order statistic that correspond to each Gaussian distribution component in a speaker background model.

Specifically, if the obtained speech sample includes S speaker categories in total, for an $s^{th}$ speaker category, a second zero-order statistic $\overline{N_c(s)}$ and a second first-order statistic $\overline{F_c(s)}$ that correspond to each Gaussian distribution component c are separately calculated with reference to the foregoing formula (2) and formula (3).

S506. Calculate a first quotient between the second first-order statistic and the corresponding second zero-order statistic.

Specifically, for each speaker category s, a first quotient $\overline{F_c(s)}/\overline{N_c(s)}$ between the second first-order statistic $\overline{F_c(s)}$ corresponding to each Gaussian distribution component c in the speaker background model and the corresponding second zero-order statistic $\overline{N_c(s)}$ is calculated.

S508. Build a statistic space according to the calculated first quotient.

Specifically, first quotients for all the speaker categories s and corresponding to all the Gaussian distribution components c in the speaker background model are sequentially arranged according to the speaker category and the corresponding Gaussian distribution component to form a matrix representing the statistic space.

In this example embodiment, a statistic space is built based on a first quotient between a second first-order statistic and a corresponding second zero-order statistic. Because a quotient between a first-order statistic and a corresponding zero-order statistic basically remains in a stable range, calculation of mapping a first zero-order statistic and a first first-order statistic to the statistic space is facilitated, thereby improving calculation efficiency.

In some embodiments, S508 includes: subtracting an average value of corresponding Gaussian distribution components from the calculated first quotient to obtain a corresponding difference, and sequentially arranging the obtained differences according to the speaker category and the corresponding Gaussian distribution component to form a matrix representing the statistic space.

Specifically, a matrix H representing the statistic space may be determined according to the following formula (10):

$$H = \left[\left(\frac{\overline{F(1)}}{\overline{N(1)}} - m\right), \left(\frac{\overline{F(2)}}{\overline{N(2)}} - m\right), \ldots, \left(\frac{\overline{F(S)}}{\overline{N(S)}} - m\right)\right] \quad \text{formula (10)}$$

where m represents a supervector of an average value of the speaker background model; $\overline{F(s)}$, $s \in [1,S]$, represents a second first-order statistic matrix corresponding to an $s^{th}$ speaker category, and $\overline{N(s)}$ represents a second zero-order statistic that is of the $s^{th}$ speaker category and that corresponds to each Gaussian distribution component c in the speaker background model.

$$\frac{\overline{F(s)}}{\overline{N(s)}}$$

may be expressed in the following form:

$$\frac{\overline{F(s)}}{\overline{N(s)}} = \begin{pmatrix} \overline{F_1(s)}/\overline{N_1(s)} \\ \overline{F_2(s)}/\overline{N_2(s)} \\ \vdots \\ \overline{F_c(s)}/\overline{N_c(s)} \end{pmatrix}.$$

Therefore, the foregoing formula (10) may be transformed into the following formula (11):

$$H = \begin{bmatrix} (\overline{F_1(1)}/\overline{N_1(1)} - \mu_1), (\overline{F_1(2)}/\overline{N_1(2)} - \mu_1), \ldots, (\overline{F_1(S)}/\overline{N_1(S)} - \mu_1) \\ (\overline{F_2(1)}/\overline{N_2(1)} - \mu_2), (\overline{F_2(2)}/\overline{N_2(2)} - \mu_2), \ldots, (\overline{F_2(S)}/\overline{N_2(S)} - \mu_2) \\ \vdots \\ (\overline{F_C(1)}/\overline{N_C(1)} - \mu_C), (\overline{F_C(2)}/\overline{N_C(2)} - \mu_C), \ldots, (\overline{F_C(S)}/\overline{N_C(S)} - \mu_C) \end{bmatrix} \quad \text{formula (11)}$$

In this example embodiment, the average value of the corresponding Gaussian distribution components is subtracted from the calculated first quotient to obtain the corresponding difference, and the obtained differences are sequentially arranged according to the speaker category and the corresponding Gaussian distribution component to form the matrix representing the statistic space, so that a center of the built statistic space is roughly at an original of the statistic space, thereby facilitating calculation and improving calculation efficiency.

Referring back to FIG. 4, in some embodiments, S410 may include: obtaining an orthogonal base vector of the statistic space; deriving a mapping coefficient of the orthogonal base vector, where a two-norm distance between a result obtained by adding a product of the orthogonal base vector and the mapping coefficient to an average value of corresponding Gaussian distribution components, and the third quotient of the corresponding Gaussian distribution component is minimized; and adding a result obtaining by multiplying the orthogonal base vector by the mapping coefficient to the average value of the corresponding Gaussian distribution components, to obtain a second quotient between the reference first-order statistic corresponding to each Gaussian distribution component in the speaker background model and the corresponding reference zero-order statistic.

Specifically, eigenvalue decomposition may be performed on the statistic space to obtain a group of orthogonal base vectors $F^{eigen}$ of the statistic space. An optimization function may be defined for the following formula (12):

$$\min_{\varphi(u)} N_c(u) \left\| \frac{F_c(u)}{N_c(u)} - \mu_c - F^{eigen} * \varphi(u) \right\|_2^2 \quad \text{formula (12)}$$

where $N_c(u)$ represents a first zero-order statistic corresponding to the Gaussian distribution component c; $F_c(u)$ represents a first first-order statistic corresponding to the Gaussian distribution component $$c; \frac{F_c(u)}{N_c(u)}$$

represents a third quotient corresponding to the Gaussian distribution component c; $\mu_c$ represents an average value corresponding to the Gaussian distribution component c; $F^{eigen}$ represents an orthogonal base vector of the statistic space H; and $\varphi(u)$ represents the mapping coefficient.

The optimization function as the formula (12) is optimized to obtain an optimal mapping coefficient $\varphi(u)$ as the following formula (13):

$$\varphi(u) = [\Sigma_{c=1}^{C} N_c(u)(F^{eigen})^t F^{eigen}]^{-1} \Sigma_{c=1}^{C} (F^{eigen})^t (F_c(u) - N_c(u)\mu_c) \quad \text{formula (13).}$$

Further, the second quotient between the reference first-order statistic corresponding to each Gaussian distribution component in the speaker background model and the corresponding reference zero-order statistic is calculated according to the following formula (14):

$$\frac{F_c^{ref}(u)}{N_c^{ref}(u)} = F^{eigen} \varphi(u) + \mu_c. \quad \text{formula (14)}$$

In this example embodiment, the first zero-order statistic and the first first-order statistic may be accurately mapped to the statistic space.

Referring back to FIG. 3, in some embodiments, the to-be-processed speech data includes to-be-verified speech data and speech data of a target speaker category. For example, Step S312 may include: generating a to-be-verified identity vector according to a corrected statistic corresponding to the to-be-verified speech data; and generating a target speaker identity vector according to a corrected statistic corresponding to the speech data of the target speaker category. The identity vector generation method further includes: calculating a similarity between the to-be-verified identity vector and the target speaker identity vector; and performing speaker identity authentication according to the similarity.

Specifically, the speaker identity authentication may be applied to various scenarios in which an identify of an unknown user needs to be authenticated. The speaker identity authentication includes two phases: an off-line phase and an on-line phase. In the off-line phase, a large quantity of speech samples of a non-target speaker category need to be collected for training a speaker identity authentication system. The speaker identity authentication system includes an identity vector extraction module and an identity vector normalization module.

The on-line phase includes two phases: a registration phase and an authentication phase. In the registration phase, speech data of a target speaker needs to be obtained, and preprocessing, feature extraction, and model training are performed on the speech data. The speech data on which the preprocessing, the feature extraction, and the model training have been performed is then mapped to an identity vector with a fixed length. In this case, the known identity vector is a model representing an identity of the target speaker. In the authentication phase, a piece of to-be-verified speech corresponding to an unknown identity is obtained, and similarly, preprocessing, feature extraction, and model training are performed on the to-be-verified speech. The to-be-verified speech on which the preprocessing, the feature extraction, and the model training have been performed is then mapped to a to-be-verified identity vector.

Subsequently, a similarity calculation module calculates a similarity between an identity vector of a target speaker category and the to-be-verified identity vector in the authentication phase. The similarity is compared with a manually preset threshold. If the similarity is greater than or equal to the threshold, it may be determined that the identity corresponding to the to-be-verified speech matches the identity of the target speaker, and the identity authentication succeeds. If the similarity is less than the threshold, it may be determined that the identity corresponding to the to-be-verified speech does not match the identity of the target speaker, and the identity authentication fails. The similarity may be a cosine similarity, a Pearson correlation coefficient, a Euclidean distance, or the like.

In this embodiment, even for speech data whose speech duration is very short, an identity vector with relatively high identity authentication performance may still be generated by using the identity vector generation method of this embodiment, and a speaker does not need to make a long speech, so that short-time speaker recognition irrelevant to text may widely spread.

Figure 6:
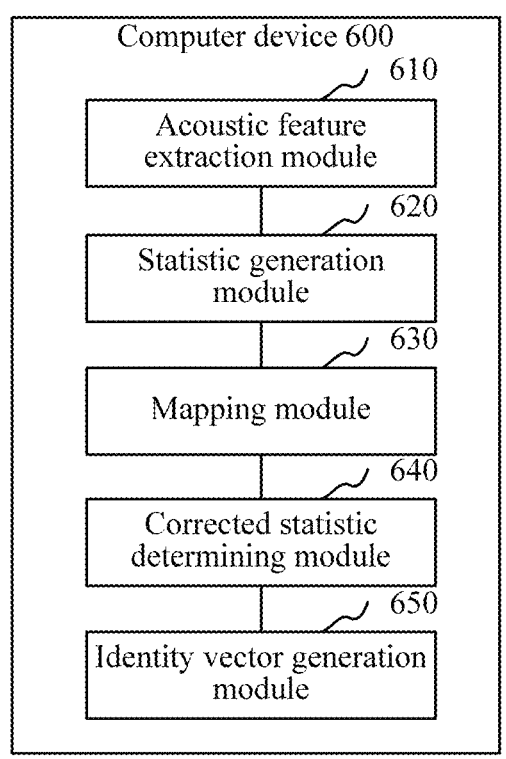
FIG. 6 is a structural block diagram of a computer device according to an example embodiment.

FIG. 6 is a structural block diagram of a computer device 600 according to an example embodiment. The computer device 600 may be used as a server in some embodiments, or may be used as a terminal in some embodiments. When the computer device 600 is used as a server, an internal structure of the server may be as shown in FIG. 2A, and when the computer device 600 is used as a terminal, an internal structure of the terminal may be as shown in FIG. 2B. Each of the modules of the computer device 600 may be implemented all or partially by using software, hardware, or a combination thereof.

As shown in FIG. 6, the computer device 600 includes an acoustic feature extraction module 610, a statistic generation module 620, a mapping module 630, a corrected statistic determining module 640, and an identity vector generation module 650.

The acoustic feature extraction module 610 is configured to: obtain to-be-processed speech data, and extract corresponding acoustic features from the to-be-processed speech data.

The statistic generation module 620 is configured to calculate a posterior probability that each of the acoustic features belongs to each Gaussian distribution component in a speaker background model to obtain a statistic.

The mapping module 630 is configured to map the statistic to a statistic space to obtain a reference statistic, the statistic space being built according to a statistic corresponding to a speech sample exceeding preset speech duration.

The corrected statistic determining module 640 is configured to determine a corrected statistic according to the calculated statistic and the reference statistic.

The identity vector generation module 650 is configured to generate an identity vector according to the corrected statistic.

By means of the computer device 600, a statistic space is built according to a statistic corresponding to a speech sample exceeding preset speech duration. After a posterior probability that each of acoustic features belongs to each Gaussian distribution component in a speaker background model is calculated to obtain a statistic, the statistic is mapped to the statistic space, and an obtained reference statistic is a prior statistic. The calculated statistic is corrected by using the prior statistic to obtain a corrected statistic. The corrected statistic may compensate for a statistic offset estimation caused by extremely short speech duration of to-be-processed speech data and sparse speech, and improve identity authentication performance of an identity vector.

Figure 7:
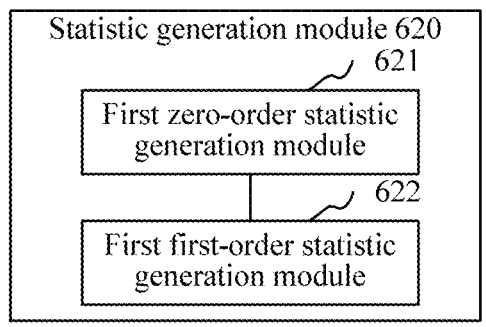
FIG. 7 is a structural block diagram of a statistic generation module according to an example embodiment.

FIG. 7 is a structural block diagram of a statistic generation module 620 according to an example embodiment. In this example embodiment, a calculated statistic includes a first zero-order statistic and a first first-order statistic. The statistic generation module 620 includes a first zero-order statistic generation module 621 and a first first-order statistic generation module 622.

The first zero-order statistic generation module 621 is configured to: corresponding to each Gaussian distribution component in a speaker background model, separately calculate a sum of posterior probabilities that all the acoustic features belong to the corresponding Gaussian distribution component as a corresponding first zero-order statistic.

The first first-order statistic generation module 622 is configured to: corresponding to each Gaussian distribution component in the speaker background model, separately calculate, by using the posterior probabilities that all the acoustic features belong to the corresponding Gaussian distribution component as weights, a weighted sum of all the acoustic features as a corresponding first first-order statistic.

Figure 8:
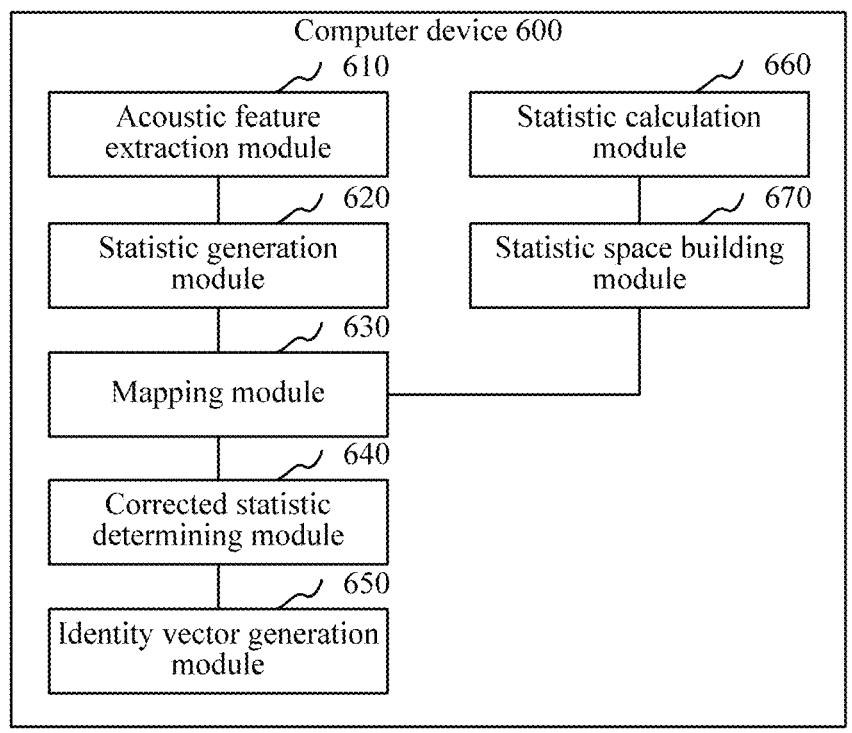
FIG. 8 is a structural block diagram of a computer device according to another example embodiment.

FIG. 8 is a structural block diagram of a computer device 600 according to another example embodiment. The computer device 600 further includes: a statistic calculation module 660 and a statistic space building module 670.

The statistic calculation module 660 is configured to: obtain the speech sample exceeding the preset speech duration, and calculate, according to a speaker category in the speech sample, a second zero-order statistic and a second first-order statistic that correspond to each Gaussian distribution component in the speaker background model.

The statistic space building module 670 is configured to: calculate a first quotient between the second first-order statistic and the corresponding second zero-order statistic, and build the statistic space according to the calculated first quotient.

In this example embodiment, a statistic space is built based on a first quotient between a second first-order statistic and a corresponding second zero-order statistic. Because a quotient between a first-order statistic and a corresponding zero-order statistic basically remains in a stable range, calculation of mapping a first zero-order statistic and a first first-order statistic to the statistic space is facilitated, thereby improving calculation efficiency.

In some embodiments, the statistic space building module 670 may be further configured to: subtract an average value of corresponding Gaussian distribution components from the calculated first quotient to obtain a corresponding difference, and sequentially arrange the obtained differences according to the speaker category and the corresponding Gaussian distribution component to form a matrix representing the statistic space.

In this example embodiment, the average value of the corresponding Gaussian distribution components is subtracted from the calculated first quotient to obtain the corresponding difference, and the obtained differences are sequentially arranged according to the speaker category and the corresponding Gaussian distribution component to form the matrix representing the statistic space, so that a center of the built statistic space is roughly at an original of the statistic space, thereby facilitating calculation and improving calculation efficiency.

In some embodiments, the reference statistic includes a second quotient between a reference first-order statistic corresponding to each Gaussian distribution component in the speaker background model and a corresponding reference zero-order statistic. The corrected statistic determining module 640 is further configured to perform weighted summation on a third quotient between the first first-order statistic and the corresponding first zero-order statistic and the second quotient of the corresponding Gaussian distribution component, to obtain, as the corrected statistic, a fourth quotient between a corrected first-order statistic corresponding to each Gaussian distribution component in the speaker background model and a corresponding corrected zero-order statistic.

In some embodiments, when the corrected statistic determining module 640 is configured to perform weighted summation, a weight of the third quotient is a result obtained by dividing a first zero-order statistic of the corresponding Gaussian distribution component by a sum of the corresponding first zero-order statistic and an adjustable parameter, and a weight of the second quotient is a result obtained by dividing the adjustable parameter by a sum of the first zero-order statistic of the corresponding Gaussian distribution component and the adjustable parameter. In this example embodiment, differentiated adjustments may be performed for different environments by adjusting the adjustable parameter, to increase robustness.

In some embodiments, the mapping module 630 is further configured to: obtain an orthogonal base vector of the statistic space; derive a mapping coefficient of the orthogonal base vector, where a two-norm distance between a result obtained by adding a product of the orthogonal base vector and the mapping coefficient to an average value of corresponding Gaussian distribution components, and the third quotient of the corresponding Gaussian distribution component is minimized; and add a result obtaining by multiplying the orthogonal base vector by the mapping coefficient to the average value of the corresponding Gaussian distribution components, to obtain a second quotient between the reference first-order statistic corresponding to each Gaussian distribution component in the speaker background model and the corresponding reference zero-order statistic.

In some embodiments, the to-be-processed speech data includes to-be-verified speech data and speech data of a target speaker category. The identity vector generation module 650 is further configured to: generate a to-be-verified identity vector according to a corrected statistic corresponding to the to-be-verified speech data; and generate a target speaker identity vector according to a corrected statistic corresponding to the speech data of the target speaker category.

Figure 9:
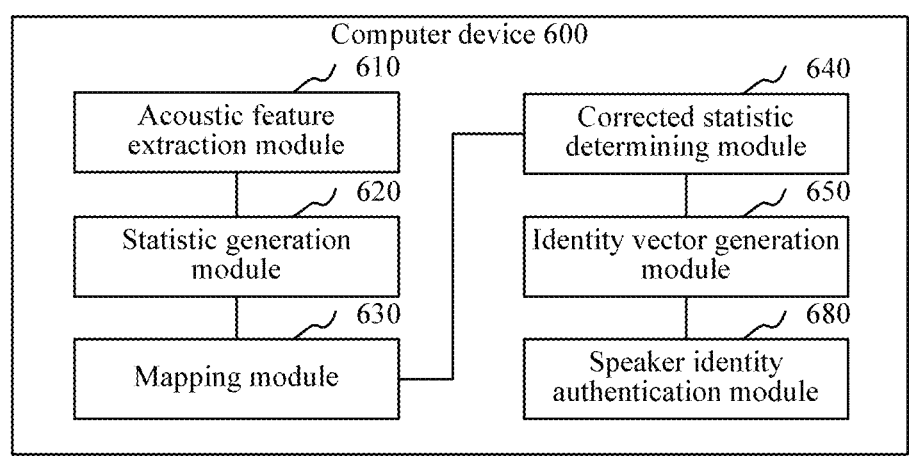
FIG. 9 is a structural block diagram of a computer device according to still another example embodiment.

FIG. 9 is a structural block diagram of a computer device 600 according to still another embodiment. The computer device 600 in this embodiment further includes a speaker identity authentication module 680, configured to: calculate a similarity between the to-be-verified identity vector and the target speaker identity vector; and perform speaker identity authentication according to the similarity.

In this example embodiment, even for speech data whose speech duration is very short, an identity vector with relatively high identity authentication performance may still be generated by using the identity vector generation method of this embodiment, and a speaker does not need to make a long speech, so that short-time speaker recognition irrelevant to text may widely spread.

In some embodiments, a computer device is provided, including a memory and a processor. The memory stores a computer-readable instruction. When executed by the processor, the computer-readable instruction causes the processor to perform the following steps: obtaining to-be-processed speech data; extracting corresponding acoustic features from the to-be-processed speech data; calculating a posterior probability that each of the acoustic features belongs to each Gaussian distribution component in a speaker background model to obtain a statistic; mapping the statistic to a statistic space to obtain a reference statistic, the statistic space being built according to a statistic corresponding to a speech sample exceeding preset speech duration; determining a corrected statistic according to the calculated statistic and the reference statistic; and generating an identity vector according to the corrected statistic.

In some embodiments, the calculated statistic includes a first zero-order statistic and a first first-order statistic, and the calculating a posterior probability that each of the acoustic features belongs to a Gaussian distribution component in a speaker background model to obtain a statistic includes corresponding to each Gaussian distribution component in the speaker background model, separately calculating, by using the posterior probabilities that all the acoustic features belong to the corresponding Gaussian distribution component as weights, a weighted sum of all the acoustic features as a corresponding first first-order statistic.

In some embodiments, the computer-readable instruction further causes the processor to perform the following steps: obtaining the speech sample exceeding the preset speech duration; calculating, according to a speaker category in the speech sample, a second zero-order statistic and a second first-order statistic that correspond to each Gaussian distribution component in the speaker background model; calculating a first quotient between the second first-order statistic and the corresponding second zero-order statistic; and building the statistic space according to the calculated first quotient.

In some embodiments, the building the statistic space according to the calculated first quotient includes: subtracting an average value of corresponding Gaussian distribution components from the calculated first quotient to obtain a corresponding difference; and sequentially arranging the obtained differences according to the speaker category and the corresponding Gaussian distribution component to form a matrix representing the statistic space.

In some embodiments, the reference statistic includes a second quotient between a reference first-order statistic corresponding to each Gaussian distribution component in the speaker background model and a corresponding reference zero-order statistic. The determining a corrected statistic according to the calculated statistic and the reference statistic includes: performing weighted summation on a third quotient between the first first-order statistic and the corresponding first zero-order statistic and the second quotient of the corresponding Gaussian distribution component, to obtain, as the corrected statistic, a fourth quotient between a corrected first-order statistic corresponding to each Gaussian distribution component in the speaker background model and a corresponding corrected zero-order statistic.

In some embodiments, in the weighted summation, a weight of the third quotient is a result obtained by dividing a first zero-order statistic of the corresponding Gaussian distribution component by a sum of the corresponding first zero-order statistic and an adjustable parameter, and a weight of the second quotient is a result obtained by dividing the adjustable parameter by a sum of the first zero-order statistic of the corresponding Gaussian distribution component and the adjustable parameter.

In some embodiments, the mapping the statistic to a statistic space to obtain a reference statistic includes: obtaining an orthogonal base vector of the statistic space; deriving a mapping coefficient of the orthogonal base vector, where a two-norm distance between a result obtained by adding a product of the orthogonal base vector and the mapping coefficient to an average value of corresponding Gaussian distribution components, and the third quotient of the corresponding Gaussian distribution component is minimized; and adding a result obtaining by multiplying the orthogonal base vector by the mapping coefficient to the average value of the corresponding Gaussian distribution components, to obtain a second quotient between the reference first-order statistic corresponding to each Gaussian distribution component in the speaker background model and the corresponding reference zero-order statistic.

In some embodiments, the to-be-processed speech data includes to-be-verified speech data and speech data of a target speaker category. The generating an identity vector according to the corrected statistic includes: generating a to-be-verified identity vector according to a corrected statistic corresponding to the to-be-verified speech data; and generating a target speaker identity vector according to a corrected statistic corresponding to the speech data of the target speaker category. The computer-readable instruction further causes the processor to perform the following steps: calculating a similarity between the to-be-verified identity vector and the target speaker identity vector; and performing speaker identity authentication according to the similarity.

By means of the computer device, a statistic space is built according to a statistic corresponding to a speech sample exceeding preset speech duration. After a posterior probability that each of acoustic features belongs to each Gaussian distribution component in a speaker background model is calculated to obtain a statistic, the statistic is mapped to the statistic space, and an obtained reference statistic is a prior statistic. The calculated statistic is corrected by using the prior statistic to obtain a corrected statistic. The corrected statistic may compensate for a statistic offset estimation caused by extremely short speech duration of to-be-processed speech data and sparse speech, and improve identity authentication performance of an identity vector.

In an embodiment, one or more non-volatile computer-readable storage media storing computer-readable instructions are provided. When executed by one or more processors, the computer-readable instructions cause the one or more processors to perform the following steps: obtaining to-be-processed speech data; extracting corresponding acoustic features from the to-be-processed speech data; calculating a posterior probability that each of the acoustic features belongs to each Gaussian distribution component in a speaker background model to obtain a statistic; mapping the statistic to a statistic space to obtain a reference statistic, the statistic space being built according to a statistic corresponding to a speech sample exceeding preset speech duration; determining a corrected statistic according to the calculated statistic and the reference statistic; and generating an identity vector according to the corrected statistic.

In some embodiments, the calculated statistic includes a first zero-order statistic and a first first-order statistic; and the calculating a posterior probability that each of the acoustic features belongs to a Gaussian distribution component in a speaker background model to obtain a statistic includes: corresponding to each Gaussian distribution component in the speaker background model, separately calculating, by using the posterior probabilities that all the acoustic features belong to the corresponding Gaussian distribution component as weights, a weighted sum of all the acoustic features as a corresponding first first-order statistic.

In some embodiments, the computer-readable instruction further causes the processor to perform the following steps: obtaining the speech sample exceeding the preset speech duration; calculating, according to a speaker category in the speech sample, a second zero-order statistic and a second first-order statistic that correspond to each Gaussian distribution component in the speaker background model; calculating a first quotient between the second first-order statistic and the corresponding second zero-order statistic; and building the statistic space according to the calculated first quotient.

In some embodiments, the building the statistic space according to the calculated first quotient includes: subtracting an average value of corresponding Gaussian distribution components from the calculated first quotient to obtain a corresponding difference; and sequentially arranging the obtained differences according to the speaker category and the corresponding Gaussian distribution component to form a matrix representing the statistic space.

In some embodiments, the reference statistic includes a second quotient between a reference first-order statistic corresponding to each Gaussian distribution component in the speaker background model and a corresponding reference zero-order statistic. The determining a corrected statistic according to the calculated statistic and the reference statistic includes: performing weighted summation on a third quotient between the first first-order statistic and the corresponding first zero-order statistic and the second quotient of the corresponding Gaussian distribution component, to obtain, as the corrected statistic, a fourth quotient between a corrected first-order statistic corresponding to each Gaussian distribution component in the speaker background model and a corresponding corrected zero-order statistic.

In some embodiments, in the weighted summation, a weight of the third quotient is a result obtained by dividing a first zero-order statistic of the corresponding Gaussian distribution component by a sum of the corresponding first zero-order statistic and an adjustable parameter, and a weight of the second quotient is a result obtained by dividing the adjustable parameter by a sum of the first zero-order statistic of the corresponding Gaussian distribution component and the adjustable parameter.

In some embodiments, the mapping the statistic to a statistic space to obtain a reference statistic includes: obtaining an orthogonal base vector of the statistic space; deriving a mapping coefficient of the orthogonal base vector, where a two-norm distance between a result obtained by adding a product of the orthogonal base vector and the mapping coefficient to an average value of corresponding Gaussian distribution components, and the third quotient of the corresponding Gaussian distribution component is minimized; and adding a result obtaining by multiplying the orthogonal base vector by the mapping coefficient to the average value of the corresponding Gaussian distribution components, to obtain a second quotient between the reference first-order statistic corresponding to each Gaussian distribution component in the speaker background model and the corresponding reference zero-order statistic.

In some embodiments, the to-be-processed speech data includes to-be-verified speech data and speech data of a target speaker category. The generating an identity vector according to the corrected statistic includes: generating a to-be-verified identity vector according to a corrected statistic corresponding to the to-be-verified speech data; and generating a target speaker identity vector according to a corrected statistic corresponding to the speech data of the target speaker category. The computer-readable instruction further causes the processor to perform the following steps: calculating a similarity between the to-be-verified identity vector and the target speaker identity vector; and performing speaker identity authentication according to the similarity.

In some embodiments, by means of the computer-readable storage medium, a statistic space is built according to a statistic corresponding to a speech sample exceeding preset speech duration. After a posterior probability that each of acoustic features belongs to each Gaussian distribution component in a speaker background model is calculated to obtain a statistic, the statistic is mapped to the statistic space, and an obtained reference statistic is a prior statistic. The calculated statistic is corrected by using the prior statistic to obtain a corrected statistic. The corrected statistic may compensate for a statistic offset estimation caused by extremely short speech duration of to-be-processed speech data and sparse speech, and improve identity authentication performance of an identity vector.

A person of ordinary skill in the art may understand that all or some of the procedures of the methods of the foregoing embodiments may be implemented by a computer program instructing relevant hardware. The program may be stored in a non-volatile computer-readable storage medium. When the program is executed, the program may include the procedures of the embodiments of the foregoing methods. The storage medium may be a magnetic disk, an optical disc, a read-only memory (ROM), or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The foregoing embodiments describe only several implementations of this application, and the descriptions are specific and detailed, but cannot be construed as a limitation to the patent scope of the present disclosure. It should be noted that various changes and improvements may further be made by a person of ordinary skill in the art without departing from the ideas of this application, and these changes and improvements all fall within the protection scope of this application. Therefore, the protection scope of the patent of this application shall be subject to the appended claims.

What is claimed is:

1. A method, comprising:
   obtaining to-be-processed speech data;
   extracting corresponding acoustic features from the to-be-processed speech data;
   calculating a posterior probability that each of the acoustic features belongs to each Gaussian distribution component in a speaker background model to obtain a statistic;
   mapping the statistic to a statistic space to obtain a reference statistic, the statistic space built according to a statistic corresponding to a speech sample exceeding a preset threshold speech duration;
   determining a corrected statistic according to the calculated statistic and the reference statistic; and
   generating an identity vector according to the corrected statistic.

2. The method according to claim 1, wherein the calculated statistic comprises a first zero-order statistic and a first first-order statistic; and the calculation of the posterior probability comprises:
   corresponding to each Gaussian distribution component in the speaker background model, separately calculating a sum of posterior probabilities that all the acoustic features belong to the corresponding Gaussian distribution component as a corresponding first zero-order statistic; and
   corresponding to each Gaussian distribution component in the speaker background model, separately calculating, by using the posterior probabilities that all the acoustic features belong to the corresponding Gaussian distribution component as weights, a weighted sum of all the acoustic features as a corresponding first first-order statistic.

3. The method according to claim 2, further comprising:
   obtaining the speech sample exceeding the threshold speech duration;
   calculating, according to a speaker category in the speech sample, a second zero-order statistic and a second first-order statistic that correspond to each Gaussian distribution component in the speaker background model;
   calculating a quotient between the second first-order statistic and the corresponding second zero-order statistic; and
   building the statistic space according to the calculated quotient.

4. The method according to claim 3, wherein the building the statistic space according to the calculated quotient comprises:
   subtracting an average value of corresponding Gaussian distribution components from the calculated quotient to obtain a corresponding difference; and
   sequentially arranging the obtained differences according to the speaker category and the corresponding Gaussian distribution component to form a matrix representing the statistic space.

5. The method according to claim 2, wherein the reference statistic comprises a first quotient between a reference first-order statistic corresponding to each Gaussian distribution component in the speaker background model and a corresponding reference zero-order statistic; and the determining of the corrected statistic according to the calculated statistic and the reference statistic comprises:
   performing weighted summation on a second quotient between the first first-order statistic and the corresponding first zero-order statistic and the first quotient of the corresponding Gaussian distribution component, to obtain, as the corrected statistic, a third quotient between a corrected first-order statistic corresponding to each Gaussian distribution component in the speaker background model and a corresponding corrected zero-order statistic.

6. The method according to claim 5, wherein in the weighted summation, a weight of the quotient is a result obtained by dividing a first zero-order statistic of the corresponding Gaussian distribution component by a sum of the corresponding first zero-order statistic and an adjustable parameter, and a weight of the first quotient is a result obtained by dividing the adjustable parameter by a sum of the first zero-order statistic of the corresponding Gaussian distribution component and the adjustable parameter.

7. The method according to claim 5, wherein the mapping the statistic to a statistic space to obtain a reference statistic comprises:
   obtaining an orthogonal base vector of the statistic space;
   deriving a mapping coefficient of the orthogonal base vector, wherein a two-norm distance between a result obtained by adding a product of the orthogonal base vector and the mapping coefficient to an average value of corresponding Gaussian distribution components, and the second quotient of the corresponding Gaussian distribution component is minimized; and
   adding a result obtaining by multiplying the orthogonal base vector by the mapping coefficient to the average value of the corresponding Gaussian distribution components, to obtain the first quotient between the reference first-order statistic corresponding to each Gaussian distribution component in the speaker background model and the corresponding reference zero-order statistic.

8. The method according to claim 5, wherein the to-be-processed speech data comprises to-be-verified speech data and speech data of a target speaker category; and generating an identity vector according to the corrected statistic comprises:
   generating a to-be-verified identity vector according to a corrected statistic corresponding to the to-be-verified speech data; and
   generating a target speaker identity vector according to a corrected statistic corresponding to the speech data of the target speaker category, and wherein
   the method further comprises:
   calculating a similarity between the to-be-verified identity vector and the target speaker identity vector; and
   performing speaker identity authentication according to the similarity.

9. A computer device comprising:
   at least one memory configured to store computer program code; and at least one processor configured to access said at least one memory and operate according to said computer program code, said computer program code including:

first obtaining code configured to cause the at least one processor to obtain to-be-processed speech data;

extracting code configured to cause the at least one processor to extract corresponding acoustic features from the to-be-processed speech data;

first calculating code configured to cause the at least one processor to calculate a posterior probability that each of the acoustic features belongs to each Gaussian distribution component in a speaker background model to obtain a statistic;

mapping code configured to cause the at least one processor to map the statistic to a statistic space to obtain a reference statistic, the statistic space being built according to a statistic corresponding to a speech sample exceeding threshold speech duration;

determining code configured to cause the at least one processor to determine a corrected statistic according to the calculated statistic and the reference statistic; and generating code configured to cause the at least one processor to generate an identity vector according to the corrected statistic.

10. The computer device according to claim 9, wherein the calculated statistic comprises a first zero-order statistic and a first first-order statistic; and the first calculating code is further configured to cause the at least one processor to:

corresponding to each Gaussian distribution component in the speaker background model, separately calculate a sum of posterior probabilities that all the acoustic features belong to the corresponding Gaussian distribution component as a corresponding first zero-order statistic; and corresponding to each Gaussian distribution component in the speaker background model, separately calculate, by using the posterior probabilities that all the acoustic features belong to the corresponding Gaussian distribution component as weights, a weighted sum of all the acoustic features as a corresponding first first-order statistic.

11. The computer device according to claim 10, wherein the program code further includes:

second obtaining code configured to cause the at least one processor to obtain the speech sample exceeding the threshold speech duration;

second calculating code configured to cause the at least one processor to calculate, according to a speaker category in the speech sample, a second zero-order statistic and a second first-order statistic that correspond to each Gaussian distribution component in the speaker background model;

third calculating code configured to cause the at least one processor to calculate a first quotient between the second first-order statistic and the corresponding second zero-order statistic; and building code configured to cause the at least one processor to build the statistic space according to the calculated quotient.

12. The computer device according to claim 11, wherein the building code is further configured to cause the at least one processor to subtract an average value of corresponding Gaussian distribution components from the calculated quotient to obtain a corresponding difference; and sequentially arrange the obtained differences according to the speaker category and the corresponding Gaussian distribution component to form a matrix representing the statistic space.

13. The computer device according to claim 10, wherein the reference statistic comprises a first quotient between a reference first-order statistic corresponding to each Gaussian distribution component in the speaker background model and a corresponding reference zero-order statistic; and the determining code is further configured to cause the at least one processor to:

perform weighted summation on a second quotient between the first first-order statistic and the corresponding first zero-order statistic and the first quotient of the corresponding Gaussian distribution component, to obtain, as the corrected statistic, a third quotient between a corrected first-order statistic corresponding to each Gaussian distribution component in the speaker background model and a corresponding corrected zero-order statistic.

14. The computer device according to claim 13, wherein in the weighted summation, a weight of the second quotient is a result obtained by dividing a first zero-order statistic of the corresponding Gaussian distribution component by a sum of the corresponding first zero-order statistic and an adjustable parameter, and a weight of the first quotient is a result obtained by dividing the adjustable parameter by a sum of the first zero-order statistic of the corresponding Gaussian distribution component and the adjustable parameter.

15. The computer device according to claim 13, wherein the mapping code is further configured to cause the at least one processor to:

obtain an orthogonal base vector of the statistic space;

derive a mapping coefficient of the orthogonal base vector, wherein a two-norm distance between a result obtained by adding a product of the orthogonal base vector and the mapping coefficient to an average value of corresponding Gaussian distribution components, and the second quotient of the corresponding Gaussian distribution component is minimized; and add a result obtaining by multiplying the orthogonal base vector by the mapping coefficient to the average value of the corresponding Gaussian distribution components, to obtain the first quotient between the reference first-order statistic corresponding to each Gaussian distribution component in the speaker background model and the corresponding reference zero-order statistic.

16. The computer device according to claim 9, wherein the to-be-processed speech data comprises to-be-verified speech data and speech data of a target speaker category; and the generating code is further configured to cause the at least one processor to:

generate a to-be-verified identity vector according to a corrected statistic corresponding to the to-be-verified speech data; and generate a target speaker identity vector according to a corrected statistic corresponding to the speech data of the target speaker category, wherein the program code further includes:

calculating code configured to cause the at least one processor to calculate a similarity between the to-be-verified identity vector and the target speaker identity vector; and performing code configured to cause the at least one processor to perform speaker identity authentication according to the calculated similarity.

17. A non-transitory computer readable storage medium storing a program comprising instructions executable by a processor to cause the processor to:

obtain to-be-processed speech data;

extract corresponding acoustic features from the to-be-processed speech data;

calculate a posterior probability that each of the acoustic features belongs to each Gaussian distribution component in a speaker background model to obtain a statistic;

map the statistic to a statistic space to obtain a reference statistic, the statistic space built according to a statistic corresponding to a speech sample exceeding a threshold speech duration;

determine a corrected statistic according to the calculated statistic and the reference statistic; and generate an identity vector according to the corrected statistic.

18. The non-transitory computer readable storage medium according to claim 17, wherein the calculated statistic comprises a first zero-order statistic and a first first-order statistic; and the calculating a posterior probability that each of the acoustic features belongs to a Gaussian distribution component in a speaker background model to obtain a statistic comprises:

corresponding to each Gaussian distribution component in the speaker background model, separately calculating a sum of posterior probabilities that all the acoustic features belong to the corresponding Gaussian distribution component as a corresponding first zero-order statistic; and corresponding to each Gaussian distribution component in the speaker background model, separately calculating, by using the posterior probabilities that all the acoustic features belong to the corresponding Gaussian distribution component as weights, a weighted sum of all the acoustic features as a corresponding first first-order statistic.

19. The computer-readable storage medium non-transitory computer readable storage medium according to claim 18, wherein the computer-readable instruction further causes the processor to perform the following steps:

obtaining the speech sample exceeding the threshold speech duration;

calculating, according to a speaker category in the speech sample, a second zero-order statistic and a second first-order statistic that correspond to each Gaussian distribution component in the speaker background model;

calculating a first quotient between the second first-order statistic and the corresponding second zero-order statistic; and building the statistic space according to the calculated first quotient.

20. The non-transitory computer readable storage medium according to claim 19, wherein the building the statistic space according to the calculated first quotient comprises:

subtracting an average value of corresponding Gaussian distribution components from the calculated first quotient to obtain a corresponding difference; and sequentially arranging the obtained differences according to the speaker category and the corresponding Gaussian distribution component to form a matrix representing the statistic space.

* * * * *